United States Patent

[11] 3,575,002

| [72] | Inventor | Romul E. Vuia |
|---|---|---|
| | | Laval Sur Le Lac, Quebec, Canada |
| [21] | Appl. No. | 518,065 |
| [22] | Filed | Jan. 3, 1966 |
| [45] | Patented | Apr. 13, 1971 |
| [73] | Assignee | Combustion Engineering Inc. |
| | | Windsor, Conn. |
| [32] | Priority | June 15, 1965 |
| [33] | | Canada |
| [31] | | 933,371 |

[54] COMBINATION FOSSIL FUEL AND SUPERHEATED STEAM NUCLEAR POWER PLANT
30 Claims, 6 Drawing Figs.

[52] U.S. Cl. ................................................ 60/102,
60/104, 60/105, 122/1, 122/33
[51] Int. Cl. ....................................................... F01d 13/00
[50] Field of Search .......................................... 60/104,
102, 97, (Inquired), 65, 1, 73, 105; 122/1, 33; 290/2, 4

[56] References Cited
UNITED STATES PATENTS

| 2,861,194 | 11/1958 | Bristol | 290/2 |
|---|---|---|---|
| 2,955,429 | 10/1960 | Miller | 60/102X |
| 3,162,581 | 12/1964 | Brunner | 60/104X |
| 3,219,831 | 11/1965 | Ray et al. | 290/2 |
| 3,231,475 | 1/1966 | Kagi | 60/104X |
| 3,244,598 | 4/1966 | Rose et al. | 60/102X |
| 3,244,898 | 4/1966 | Hickox | 290/2 |
| 3,329,575 | 7/1967 | Burbach et al. | 60/104 |
| 2,064,486 | 12/1936 | Miller | 122/33X |
| 2,762,201 | 9/1956 | Sampson | 60/104X |
| 2,997,032 | 8/1961 | Wedel | 122/33 |
| 3,100,967 | 8/1963 | Brunner | 60/105X |
| 3,128,233 | 4/1964 | Kuerzel | 60/104X |
| 3,306,044 | 2/1967 | Michel et al. | 60/105 |
| 3,309,282 | 3/1967 | Maldague | 60/104X |

*Primary Examiner*—Carroll B. Dority, Jr.
*Attorneys*—Edward L. Kochey, Jr., Richard H. Berneike, Carlton F. Bryant, Arthur C. Firl, Eldon H. Luther, Robert L. Olson and John F. Carney

ABSTRACT: A power plant arrangement including a nuclear reactor generating steam at a low and generally saturated temperature. A fossil-fuel fired steam generator having steam generating tubes lining the furnace walls includes a flue which contains superheater surface. Steam generated by the nuclear reactor at low temperature flows through the superheater surface located in the flue of the fossil-fuel fired steam generator to be superheated and then conveyed to a turbine.

Patented April 13, 1971

INVENTOR
ROMUL E. VUIA

BY E L Kocher
AGENT

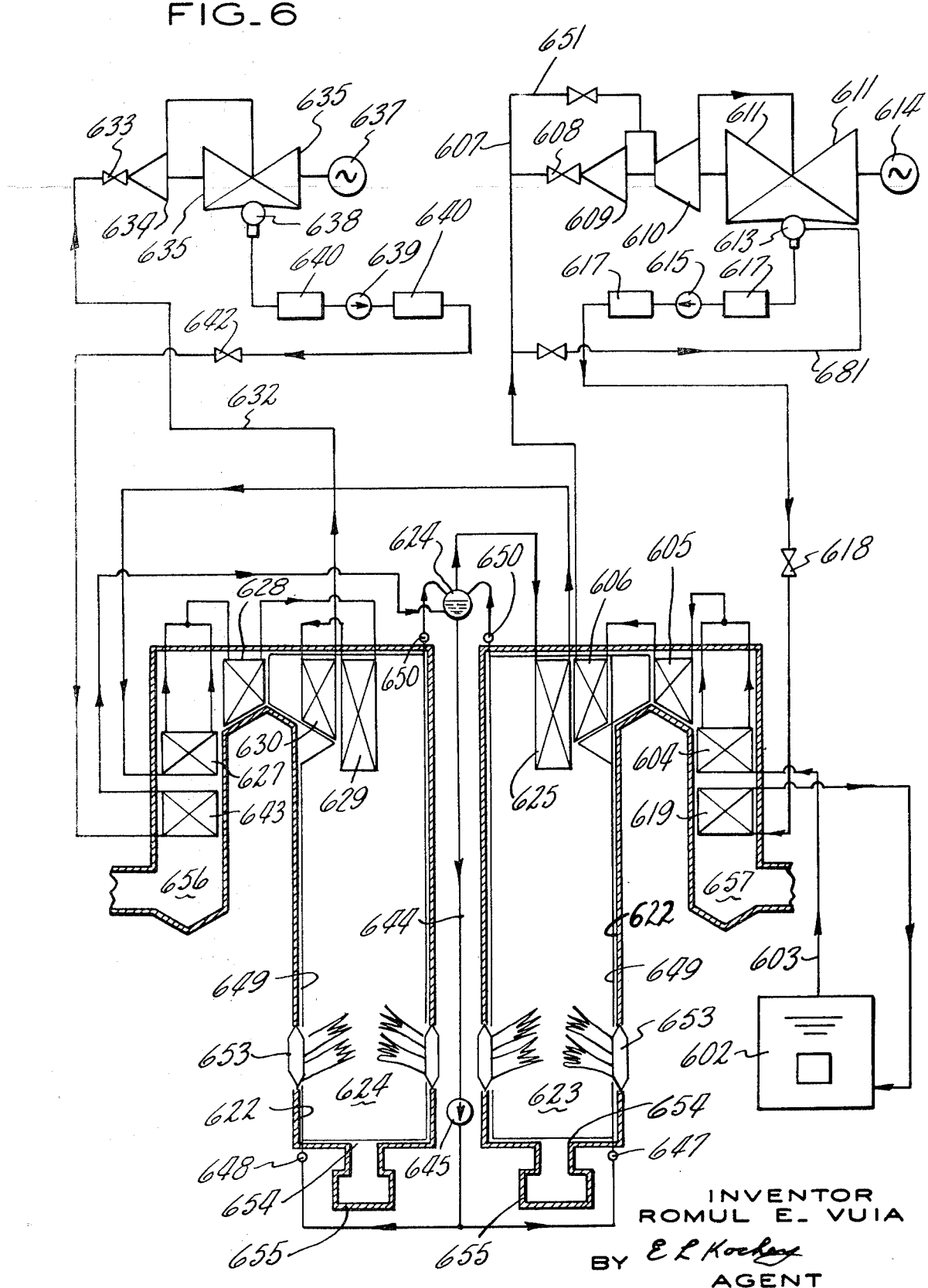
FIG_6

COMBINATION FOSSIL FUEL AND SUPERHEATED STEAM NUCLEAR POWER PLANT

This invention relates to nuclear steam power plants and in particular to a method and apparatus for obtaining and using superheated steam in said power plants.

Due to metallurgical and nuclear fuel characteristic limitations, most of today's nuclear reactor systems are producing low pressure saturated or low temperature steam. However, as is well known, power plant cycle efficiency tends to be relatively low when using a saturated steam cycle. The steam turbine itself is somewhat less efficient due to the expansion taking place in the saturated region, and erosion can become a problem due to water forming in the turbine blading. Also, external water separators located in between high-pressure and low-pressure cylinders are required, and some times live steam reheating is necessary in order to keep the exhaust blading out of too high a moisture region. In order to get a large electrical output, the steam flow on the saturated steam cycle must be increased substantially, and turbines which are physically very large result, with the limitation on capacity tending to be the size of the turbine. Paradoxically, nuclear reactors are economically justified only for very large units.

Since most of these problems can be avoided by the use of superheated steam, separately fired superheaters burning fossil fuels have been used. By doing so, one is decreasing the heat rate of the cycle, and an appreciable increase in electrical output of the turbine for the same steam flow is achieved. For instance, Indian Point Station which was intended to operate at 400 p.s.i. and 440 saturated steam temperature uses an oil fired superheater to heat the steam to 1000° F., thus improving the heat rate of the cycle by about 17 percent.

The design of a separately fired superheater with its steam-cooled furnace is always a very difficult problem because of the high furnace metal temperature encountered. In such a unit heat must be transmitted from the furnace through the gas film on the outside of the tubes, through the tube itself, and through the steam film inside the tube, to the steam proper which is being conveyed therethrough to be heated. The metal temperature of the tube is above that of the steam being heated in a direct relationship with the internal steam film heat transfer coefficient. Inasmuch as this heat transfer coefficient is poorer for steam than for water, metal temperatures experienced in furnace tubes are substantially higher in a separately fired superheater than they would be in a water-cooled furnace of a conventional steam generator.

Since generally the pressure of steam leaving the nuclear steam generator is relatively low, the steam cycle efficiency dictates a low superheater pressure drop. An increased pressure drop across the superheater would mean either raising the pressure of the nuclear steam generator (which is limited by metallurgical or nuclear fuel characteristics) or lowering the turbine pressure, which would result in a lower turbine and overall thermal efficiency. The low pressure and low-pressure drop allowed for the separately fired superheater aggravates the condition of high metal temperature. The low pressure drop available necessitates a reduction in the design mass flow rates through the tube circuits, which in turn degrades the heat transfer coefficient. In addition, for any given flow rate the heat transfer coefficient is poor for low-pressure steam.

Therefore the design, where low pressure steam is to be heated in a separately fired superheater which must be designed for low-pressure drop, is an extremely difficult problem. This requires relatively large furnaces so that the absorption rates through the tubes may be kept to low values and the extensive use of high alloy steel. The low-pressure drop requirement, combined with the high specific volume of the low-pressure steam, necessitates the use of large diameter tubes, which inherently require increased wall thicknesses, which in its turn increases further the metal temperature. The relatively low velocities resulting from the multitude of parallel circuits, in order to comply with the low-pressure drop requirement, makes a uniform distribution of steam through the tubes along the periphery of the furnace very doubtful.

Any maldistribution of steam flow encountered is reflected in higher temperature unbalances and localized high metal temperatures, which further increases the metal temperature design requirements. In this respect design conditions are sometimes met which exceed the limits of today's materials, either from the permissible stress, metal oxidation limits or high temperature corrosion viewpoint.

A separately fired superheater in conjunction with some of the reactor types also encounters difficulties with respect to operating metal temperatures during startup of the system. When steam at low-flow rates is passed through the tubes, the low-flow results in a very poor heat transfer coefficient. This makes it impossible to safely fire the unit without exceeding allowable metal temperatures since the tubes are located in the burner zone of the unit. Therefore, large turbine bypass systems are installed so that the turbines designed to take superheated steam can be bypassed until a sufficient flow rate is obtained in the separately fired superheater to permit firing therein, in order to raise the steam temperature above saturation.

Application of gas recirculation to a separately fired superheater will operate to lower the furnace heat absorption rates to some extent. Since there is no low temperature heat absorbing surface in a separately fired superheater, the gas being recirculated to the furnace is at a relatively high temperature. Also the recirculation of the gas operates to further increase the gas temperature leaving the superheater surface, and accordingly that which is reintroduced to the furnace. Simply applying gas recirculation to a separately fired superheater therefore does not satisfactorily avoid the metal temperature problems described in the foregoing paragraphs.

Nuclear reactors while operating form xenon gas which is a poison. During full power operation this gas is burned at a rate which keeps it to a tolerable level while at reduced load, excess quantities of the gas are formed. Accordingly, when the reactor has been operating at very low load or has been recently shut down, considerable excess reactivity is required in order to overcome the poison effect of the xenon gas. When reactors with low reactivity, particularly those using natural uranium, are used there is insufficient reactivity to overcome the poisoning, and the unit cannot be restarted after shutdown until the gas decays sufficiently which takes about 36 to 48 hours.

Even reactors which initially have high excess reactivity suffer from fuel depletion during operation. Therefore, these reactors towards the end of the fuel lifetime have the same problems as reactors which are initially designed for low excess activity and cannot readily be operated at low load or restarted.

Reactors such as those employing natural uranium which have a low excess reactivity, even equipped with booster fuel rods, cannot operate below 70 to 80 percent for an extended period of time without the xenon poisoning forcing a shutdown. Accordingly, a full capacity turbine bypass is employed which permits the reactor to continue to operate at full rating if the electrical load on the plant is tripped or reduced temporarily. Obviously, the conveying and cooling equipment required for such a full capacity bypass is quite expensive.

When such a reactor is used for generating steam in conjunction with a fossil fired superheater, a superheater or any other component failure requires the entire plant to be shut down for up to 48 hours with no steam generating capacity being available.

It is also apparent that with a limitation on low load operation of the reactor the nuclear plant is best suited for base load and is not practical for swinging load or peaking operation. When the nuclear plant is used in a system which generates most of its electricity by low cost power, such as hydroplants, it is desirable due to economics, to base load the hydrofraction and to take all load swings on the nuclear reactor or thermal units. Due to the previously mentioned limitations on low load, some of the nuclear reactors are poorly adapted to such variable load.

A nuclear plant is found to have a high capital cost but a relatively low fuel cost as compared to fossil-fuel units. Where the nuclear plant is required to take load swings, which means essentially it is a peaking type unit, use of a nuclear plant would be particularly poor economics.

Nuclear plants are disadvantageous at this time due to the relatively long time in construction as compared to a fossil-fuel plant. During this time no electric power at all is available from the plant.

It is an object of this invention to provide an improved nuclear steam power plant employing superheated steam.

It is a further object to provide a power plant which will produce power at less dollars per kilowatt hour.

A further object is to provide an inexpensive superheater design having a low pressure drop and safe metal temperatures.

It is a further object to provide an apparatus whereby the nuclear steam may be superheated in a fossil fired unit having a high furnace heat release rate with safe metal temperatures.

It is a further object to provide a power plant which uses nuclear and fossil fuels and in which the loss of one unit due to loss of fuel supply or failure of nuclear or conventional components will not entirely shut down the power plant but permit operation on the remaining fraction at reduced rating.

It is a further object to provide a nuclear power plant having increased flexibility and a good turn down ratio.

It is a further object to provide a nuclear power plant system having a more efficient turbine and an increased cycle efficiency.

It is a further object to provide a nuclear power plant having a turbine smaller in physical size for a given electrical output.

It is a further object to provide a nuclear reactor steam power plant having a high pressure turbine designed for and receiving only superheated steam.

It is a further object to provide a nuclear power plant having a relatively small turbine bypass capable of maintaining the reactor available for restart in the event of loss of load by permitting it to operate at full steam output but without superheat.

A further object is to provide a system wherein moisture may be avoided in the high and low pressure turbine stages.

It is a further object to provide a nuclear steam power plant having provisions for safely supplying superheated steam to the turbine during startup.

It is a still further object to provide an integrated combination of nuclear and fossil-fuel steam generators which permits the erection of one portion earlier than the other so that power may be obtained from the plant at an earlier date.

Other and further objects of the invention will become apparent to those skilled in the art as the description proceeds.

With the aforementioned objects in view, the invention comprises an arrangement, construction and combination of the elements of the inventive organization in such a manner as to attain the results desired as hereinafter more particularly set forth in the following detailed description of an illustrative embodiment, said embodiment being shown by the accompanying drawings wherein:

FIG. 6 illustrates an embodiment of my invention wherein a twin furnace fossil-fuel fired steam generator is employed.

According to my invention a nuclear reactor generating saturated or low temperature steam is combined with a fossil-fuel fired steam generator so that the steam generated by the nuclear reactor is superheated in a superheater located in the fossil-fuel fired steam generator. This steam is then conveyed from this superheater to a steam turbine operating on the superheated steam cycle. This superheater is located in the fossil-fuel fired steam generator at a location remote from the burner zone, with the steam generating tubes of the fossil-fuel fired steam generator surrounding the burner zone. Generally either one of these steam generators may be operated independent of the other. As a result when the nuclear reactor is operating with the fossil-fuel fired steam generator out of service, saturated steam is supplied to the turbine. Provision is made to bypass the high pressure turbine at this time, thereby avoiding excessive moisture in the turbine blading.

Figure 1:
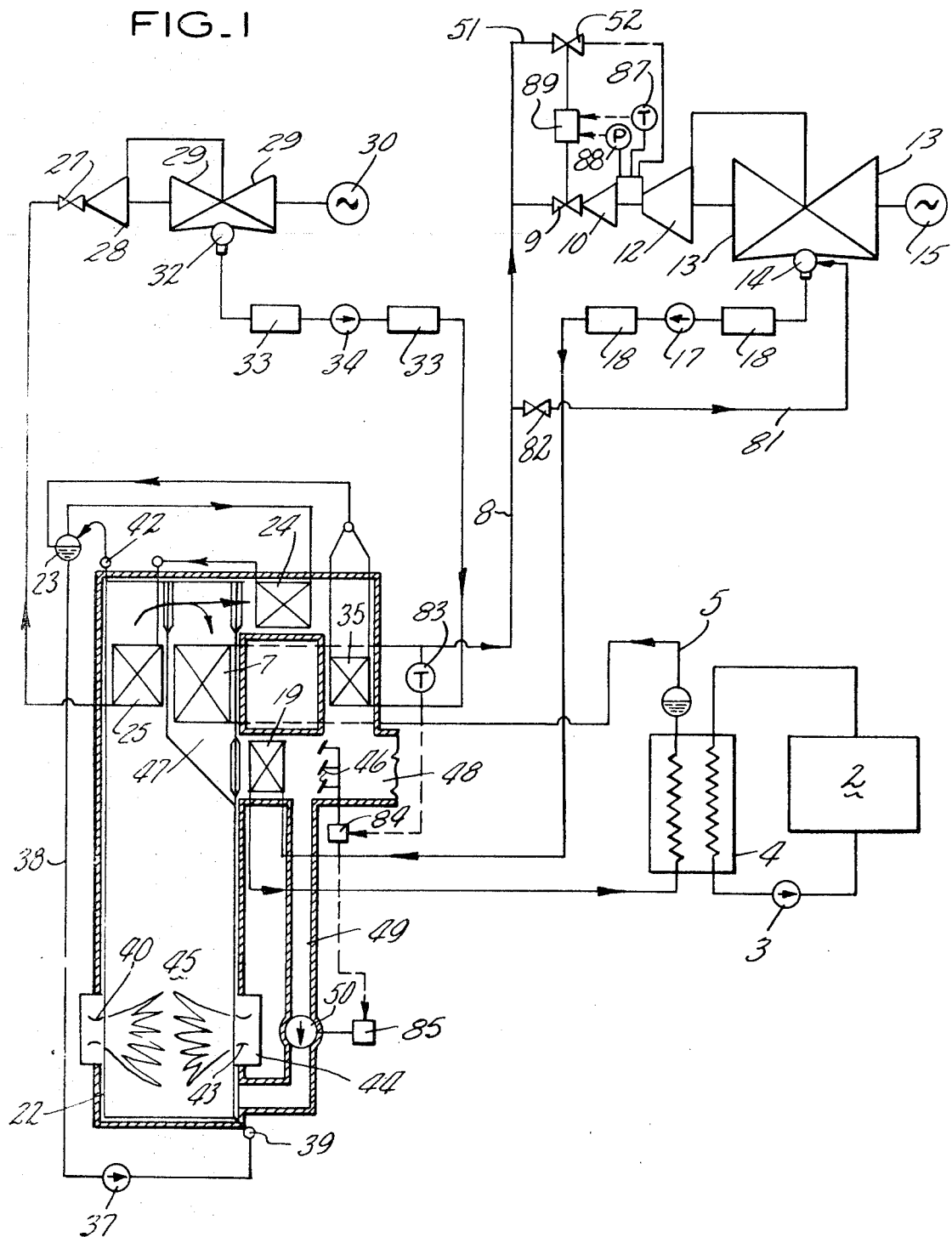
FIG. 1 illustrates an application of my invention to a cycle employing two separate turbines.

Referring to FIG. 1, primary fluid is circulated through the reactor 2 by means of circulating pump 3. The heat exchanger 4 is operative to generate essentially saturated steam which passes out through steam line 5.

This steam is conveyed through the nuclear steam superheater 7 and thence through steam line 8 to the turbine throttle control valve 9. The steam then passes serially through the various sections of the steam turbine including the high-pressure section 10, the intermediate pressure section 12 and the low-pressure sections 13 to the condenser 14. These turbine sections are directly connected to electrical generator 15. The condensate is then returned to the nuclear steam generator or heat exchanger 4 by feedwater pump 17, the water passing through the feedwater heaters 18 and the nuclear economizer 19.

The nuclear superheater 7 and nuclear economizer 19 are located in the gas flow of the fossil-fuel fired steam generator 22. This steam generator operates on a cycle independent of the nuclear steam generator with saturated steam passing from the steam drum 23 through the low temperature superheater 24 and the high temperature superheater 25. This steam then passes through the throttle valve 27 which controls the flow through the high pressure section 28 and low pressure sections 29 of a separate steam turbine which drives the electric generator 30. The steam is condensed in condenser 32 and passed through feedwater heaters 33 and feedwater pump 34 to the steam generator 22. Before entering the drum the feedwater passes through economizer 35.

Water is recirculated within the steam generator by circulating pump 37, the water passing downwardly through the downcomer 38 into supply header 39 and thence upwardly through the tubes 40 lining the walls of the furnace. The steam-water mixture thus formed is passed through outlet header 42 and conveyed to steam drum 23 where the steam and water is separated, with the water passing through the downcomer 38 and the steam continuing on to superheater 24.

A fossil-fuel such as oil is fired through burners 43 which are supplied with the fuel oil. Combustion supporting air is supplied to the burner through windbox 44. The gases formed by combustion of the oil in furnace 45 pass upwardly through the furnace over the high temperature superheater 25 and then pass through two independent flues. One of these flues contains the low-temperature superheater 24 at an upstream location and the economizer 35 at a downstream location. The second flue contains the nuclear steam superheater 7 at an upstream location and the nuclear economizer 19 at a downstream location. In this same gas pass dampers 46 are located which may be operated to restrict the gas flow through the flue 47 which contains the nuclear steam superheating surface 7. The gas from the flues is combined and passes to exit through flue 48. This flue contains an air heater, not shown, which is operative to preheat the combustion supporting air entering the windbox 44 and reduce the exit flue gas temperature to economical levels.

Downstream of the nuclear economizer 19 in flue 47 recirculating gas offtake duct 49 operates by means of gas recirculating fan 50 to recirculate cooled combustion gases back to the furnace. Operation of this gas recirculation fan increases the gas flow passing over the nuclear steam heating surfaces within flue 47 so as to be effective to increase heat absorbed and accordingly the nuclear steam temperature. Temperature transmitter 83 senses the temperature of the steam leaving the nuclear superheater 7 through line 8 and transmits a control signal to controller 84. This controller operates dampers 46 in response to the steam temperature and when the dampers reach an extreme position, a control signal passes on to controller 85 which operates to vary the speed of gas recirculation fan 50 in response to the steam temperature. Any desired opening of the dampers 46 may be selected as the maximum from fully open to completely closed. If the dampers are maintained completely closed, all steam temperature is by means of the gas recirculation fan 50.

During normal operation of the nuclear steam cycle superheated steam is supplied to the high-pressure section 10 of the nuclear steam turbine. This is accomplished by use of nuclear steam superheater 7 which is located within the steam generator 22 at a location remote from the high heat release or combustion zone in the furnace 45. This combustion zone is located in an area surrounded by the water cooled steam generating tubes 40 which are well adapted to safely operate with the heat absorption rates encountered in such high-temperature zones. The use of such steam generating tubes makes it possible to use very high heat release rates in the furnace 45 with a consequent reduction in the size of the furnace of the fuel burned. Since the nuclear superheater 7 is located remote from the combustion zone, it does not encounter the high heat absorption rates that are met in a separately fired superheater or those within the furnace of this steam generator. Consequently the nuclear superheater 7 can be designed with low velocities and low-pressure drop without fear of insufficient cooling of the nuclear superheater tubes.

The nuclear steam superheater 7 is substantially less expensive to build than a comparable separately fired superheater. However since this nuclear steam cycle operates with superheated steam, it achieves the high efficiency of a superheated steam cycle. At the same time additional steam is generated in the steam generator 22 and additional kilowatts are generated in electric generator 30.

Nuclear power plants have a high capital cost and a low fuel cost, while a fossil-fuel plant generally has a relatively low capital cost with a high fuel cost. The overall cost of power production is a function of capitalized value of the investment, fuel and operating charges.

In this combined system the cost of a superheated nuclear cycle is substantially reduced due to the significantly lower cost of the nuclear superheater, while the cost of the fossil-fuel fired steam generator 22 is increased only nominally due to the addition of increased fuel burning equipment and the addition of the flue 47. By combining the two systems in this manner where the fossil-fuel fired steam generator 22 is used to obtain all the advantages of ideal furnace design while the nuclear superheater 7 effects superheating of the nuclear steam through a low cost low-pressure drop superheater, a system is evolved which is less expensive on the capitalized basis than either system alone. Also the cost of power production is less, under the usual economic conditions.

Either the nuclear or the fossil-fuel system may be operated alone independent of the other. If it is desired to operate the steam generator 22 alone, dampers 45 are closed preventing gas flow through flue 47 with all generation accomplished in electric generator 30. Alternately, the reactor 2 may be operated with the steam generator 22 shut down. In this case, however, there would be no superheat in the steam leaving the nuclear superheater 7 and saturated steam would accordingly be supplied to the turbine 10. In order to avoid high moisture conditions in turbine high-pressure section 10 exhaust blading, a high-pressure turbine bypass line 50 including bypass valve 52 is incorporated to bypass the high-pressure turbine.

Figure 2:
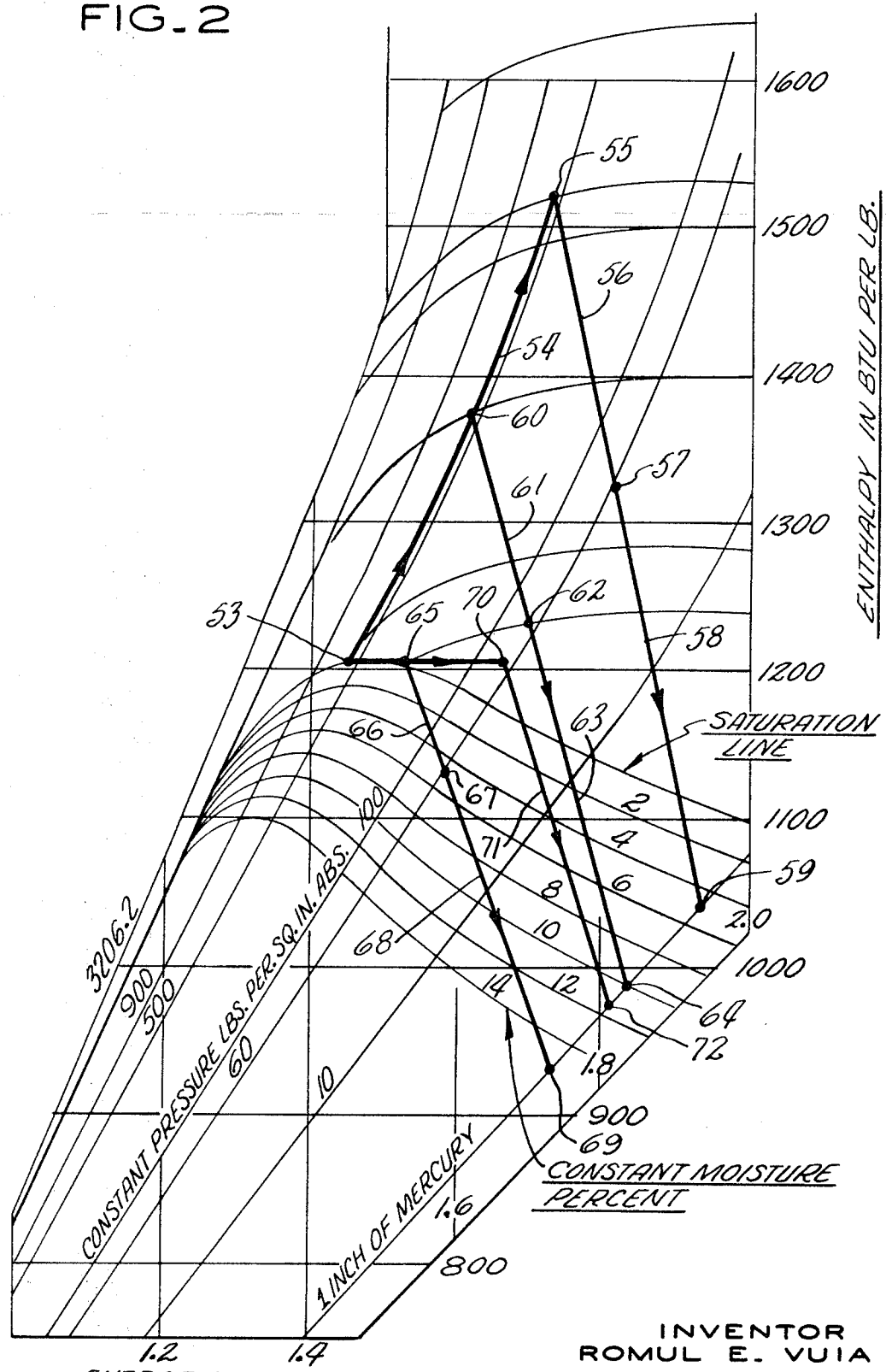
FIG. 2 is a Mollier diagram on which is indicated the steam conditions through the nuclear cycle steam turbine at various load conditions.

The operation of this bypass in relation to the high- and low-pressure turbines steam condition is best illustrated by reference to the Mollier diagram of FIG. 2. Under normal operating conditions at full load, saturated steam at 550 p.s.i. is generated by the nuclear steam generator 4 with steam conditions therefore being as indicated by point 53. It passes through the nuclear superheater being superheated along line 54 to a temperature of 1,000° F. as indicated by point 55. The steam expands along line 56 with the condition at the exit of the high-pressure turbine 10 being that designated by point 57. The steam continues to expand through the intermediate- and low-pressure turbines along line 58 reaching the condenser pressure of 1 inch of mercury at point 59.

If the turbine is operating with only partial superheat to about 740° F. as indicated by point 60, expansion occurs along line 61 through the high-pressure turbine with the steam conditions leaving the high-pressure turbine being as indicated by point 62. The steam expands along line 63 through the intermediate- and low-pressure turbines, reaching the condenser at the steam condition as indicated by point 64. Under this condition it should be noted that no moisture occurs in the high-pressure turbine although moisture does form in the intermediate and low pressure turbine, however the moisture in the last low-pressure blading will not exceed 12 percent, thus avoiding excessive water erosion problems.

However when the superheat drops below a certain figure, with the extreme situation being the case in which the thermal steam generator is out of service, moisture is formed in the high-pressure turbine and considerable moisture is formed in the intermediate and low-pressure turbines. For instance, assuming the thermal steam generator is out of service the steam delivered to the turbine is in a condition illustrated by point 53. The turbine throttle pressure drop reduces the pressure of the steam so that the steam enters the high-pressure turbine at the condition shown by point 65. The steam expanding through the high pressure turbine along line 66 exits from this turbine at the steam conditions indicated by point 67 which shows about 5 percent moisture. Continued expansion through the intermediate- and low-pressure turbines takes place along line 68 with steam reaching the low-pressure turbine at a condition as indicated by point 69 which contains in the order of 16 percent moisture. Accordingly, it can be seen that moisture exists in the high-pressure turbine which is not normally designed to accept such steam conditions with consequent blading erosion problems. The moisture leaving the low-pressure turbine substantially exceeds the accepted figure of 12 percent, therefore, leading to severe blade erosion in the low-pressure turbine.

To avoid such difficulties the high-pressure turbine is bypassed through line 50 and valve 52 so that steam is throttled from point 53 to point 70. Steam at this condition enters the intermediate-pressure turbine expanding through the intermediate- and low-pressure turbines along line 71 egressing from the low-pressure turbine with steam conditions as illustrated by point 72. Since the high-pressure turbine is bypassed all together, there is obviously no moisture problem in the blading of that turbine while the moisture leaving the low-pressure turbine is now less than 12 percent thereby avoiding excessive erosion of the blading near the exit location. Furthermore, the efficiency of the turbine will be kept more in line with its design figure since the intermediate- and low-pressure cylinders are better matched to cope with steam conditions occurring along the expansion line. Although the moisture problem becomes of concern at an inlet temperature of about 700° F., control may be advantageously based on the steam condition leaving the high pressure turbine. Accordingly, the steam conditions are sensed at the outlet of the high-pressure turbine section 10 and the bypass valve 52 is regulated in response thereto. Accordingly, problems caused by moisture in the high- and low-pressure turbine sections are avoided.

Temperature transmitter 87 and pressure transmitter 88 are located so as to sense the temperature and pressure of the steam leaving the high pressure turbine section 10. Control signals are sent from the transmitters to controller 89 which operates valves 52 and 9 in accordance with the steam conditions leaving the high pressure turbine section so as to avoid moisture at that location. As indicated in the discussion of FIG. 2, it will generally be known that from design calculations or test operation just what inlet temperature of the turbine will correspond to what turbine section exit conditions under various operating conditions. It would, accordingly be possible to regulate valves 52 and 9 in accordance with the inlet temperature, if desired.

Due to the problems of restarting a reactor after it has been shut down because of xenon poisoning, full capacity bypasses are frequently included around the turbine. Referring again to FIG. 1, turbine bypass 81 including turbine bypass valve 82 bypasses the entire steam flow around the turbine sections 10, 12 and 13 to the condenser 14. In the event that the plant is operating at full capacity with both the steam generator 22 and the reactor 2 operating at maximum load, and the electrical load is lost, the generators must both be tripped. The fuel supply to the fossil-fuel fired steam generator 22 may also be cut off. At this point the reactor is operating with full steaming output but with saturated steam passing through the steam line 8 rather than superheated steam. Accordingly, the bypass line 81 and the condensing capacity of the condenser 14 must be sized to take only the quantity of steam being put out by the nuclear steam generator 4 at saturated conditions and is, accordingly, a very small bypass as compared to the overall size of the plant.

With this combined cycle most, if not all the load swing is taken on the fossil-fuel unit. The reactor 2 which has a low fuel cost is base loaded at its maximum output, while the amount of fossil-fuel passing through burner 44 is regulated to meet the overall system requirements. During this operation the steam temperature of the steam leaving the nuclear superheater 7 is regulated by manipulation of the gas flow dampers 45 in response to the temperature of the steam leaving the nuclear superheater 7, with gas recirculation fan 49 coming into operation should there be insufficient control by means of the gas flow dampers. Obviously, other means of superheat controls can be incorporated, such as tilting burners and steam attemperation.

The temperature of the gases entering the nuclear superheater 7 is substantially lower than the temperature of the gases leaving the furnace 45 since the gases pass over the high temperature superheater 25. This location of the nuclear superheater downstream of a superheater surface such as 25 is advantageous since the low temperature of the gas permits the use of low alloy materials in the nuclear superheater. Furthermore, the location of the nuclear economizer 19 upstream of the gas recirculation takeoff duct 49 is operative to reduce the temperature of the gases being recirculated thereby decreasing the possibility that the recirculating fan 50 must be of a high alloy material. The nuclear superheater 7 is in parallel flow relation with respect to the gas flow with the economizer 35 and the low temperature superheater 24. When gas is passed over the nuclear superheater to obtain superheat, this reduces the gas flow over both the economizer 35 and the low temperature superheater 24. The reduction in heat absorption resulting in economizer 35 decreases the temperature of the feedwater being supplied to the drum and, accordingly, decreases the output of the steam generator 22, while the decrease in heat absorption by the superheater 24 working in conjunction with the reduced steam output tends to stabilize the temperature of the superheated steam leaving the steam generator 22.

Alternately dampers 46 may be held in the closed position at all times, or a solid wall may be placed at the damper location, so that gas flow is obtained over the nuclear superheater only when the gas recirculation fan is running. With such a dead end pass the temperature of the steam leaving the nuclear superheater 7 is regulated by operating the gas recirculation fan 49 in response to the steam temperature in steam line 8.

This power plant system may be started up a number of ways depending on existing conditions. Where the steam turbine has been recently shut down and is in a hot condition, it is desirable to restart with hot steam. For such a startup the fossil-fuel fired unit 22 would first be fired. When hot combustion gases are available which may be passed over the nuclear superheater 7, the reactor 2 may be started passing steam from the nuclear steam generator 4 through the superheater 7 to the turbine section 10 thereby effecting startup with superheated steam.

The turbine driving generator 15 may be started initially on saturated steam from the nuclear steam generator 4, if desired. In such an operation the nuclear reactor 2 would be started with the steam passing through the nuclear superheater 7 but picking up no heat and thereafter being conveyed to the turbine. The high-pressure section 10 of the turbine would be bypassed by means of bypass line 51 at this time. Later when the fossil-fuel fired steam generator 22 is fired and superheated steam is available in steam line 8, valve 9 is opened while valve 52 is closed, thereby passing the steam through the high-pressure turbine.

Figure 3:
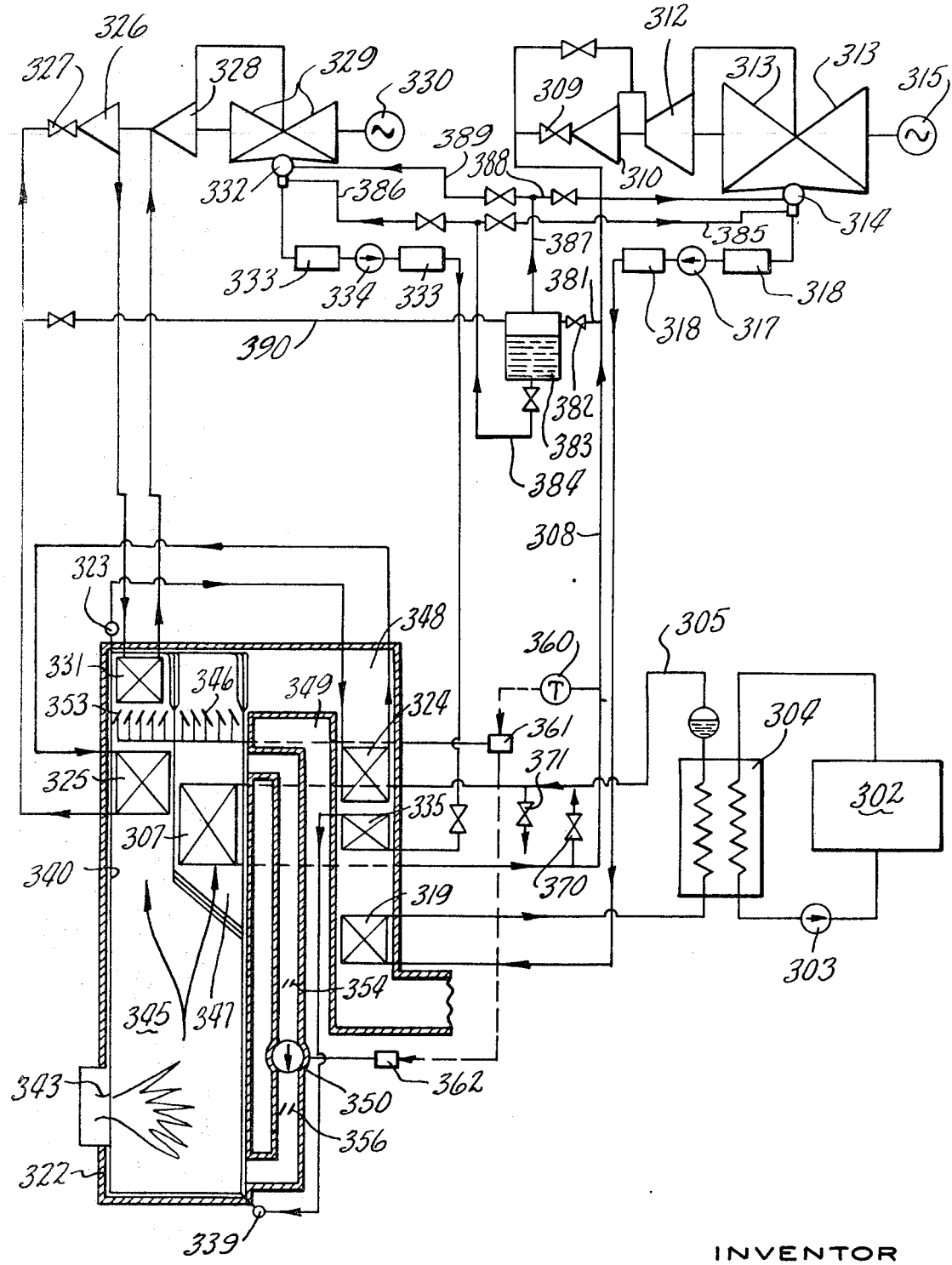
FIG. 3 is an application of my invention using a once-through steam generator and in which the bypass system for the once-through steam generator is integrated with the turbine bypass system for the once-through steam generator is integrated with the turbine bypass system of the nuclear cycle.

The FIG. 3 embodiment involves two independent cycles in a manner similar to the FIG. 1 embodiment. Primary fluid is circulated through the rector 302 by means of circulating pump 303. Heat exchanger 304 is operative to generate essentially saturated steam which passes out through steam line 305.

The steam is conveyed through the nuclear superheater 307 and thence through steam line 308 to the turbine throttle control valve 309. The steam then passes serially through the various sections of the steam turbine including the high-pressure section 310, the intermediate-pressure section 312 and the low-pressure section 313 to the condenser 314. These turbine sections are directly connected to electric generator 315. The condensate is then returned to the nuclear steam generator or heat exchanger 304 by feedwater pump 317, the water passing through the feedwater heaters 318 and the nuclear economizer 319.

The nuclear superheater 307 and the nuclear economizer 309 are located in the gas flow portion of the fossil-fuel fired once-through type steam generator 322. This steam generator operates on a cycle independent of the nuclear steam generator with steam passing from the furnace wall outlet header 323 through the low-temperature superheater 324 and the high temperature superheater 325. The steam then passes through the throttle valve 327 which controls the flow of steam to the turbine. The steam continues serially through the superpressure turbine 326, the reheater 331, the intermediate-pressure turbine section 328 and the low-pressure turbine sections 329. The turbines are directly connected to drive the electric generator 330. The steam is condensed in condenser 332 passing through feedwater heaters 333 and feedwater pump 334 to the steam generator 322.

The water in entering the steam generator passes first through the economizer 335 and then to supply header 339 from which it passes up through the tubes 340 lining the walls of the furnace 345.

Fossil-fuel such as oil is fired through burner 343 which is supplied with fuel oil and combustion supporting air. The gases formed by the combustion of the oil in furnace 345 pass upwardly through the furnace dividing into two independent flues. One of these flues contains the high temperature superheater 325 and reheater 331, while the second flue contains the nuclear steam superheater 307. Gas flow dampers 353 and 346 are located in the respective ducts to control the gas flow passing therethrough. The gas from the flues is combined and passes to exit through flue 348. This flue contains the low temperature superheater 324, the economizer 335 and the nuclear economizer 319. The flue also contains an air heater (not shown) which is operative to preheat the combustion supporting air entering through burner 343.

Downstream of the nuclear superheater in flue 347 recirculating gas offtake duct 349 operates by means of gas recirculating fan 350 to recirculate cooled combustion gases back to the furnace. Operation of this gas recirculation fan increases the gas flow passing over the nuclear steam heating surface 307 located within the flue 347 so as to be effective to increase the heat absorbed and, accordingly, the nuclear steam temperature.

The temperature of the steam leaving the nuclear superheater 307 is controlled during operation by manipulation of the gas flow dampers 353 and 346 and the gas recirculation fan 350. The temperature of the steam leaving the nuclear steam superheater 307 is sensed by temperature transmitter 360 and the control signal transmitted to controller 361. This controller operates the gas flow dampers 346 and 353 opening dampers 346 when an increased steam temperature is required while simultaneously closing dampers 353. When the dampers reach a preselected maximum position, further temperature control is effected in response to a control signal sent by controller 361 to controller 363 which varies the operation of the gas recirculation fan 350. Recirculated gas dampers 356 are maintained in the closed position whenever the gas recirculation fan is not operating to prevent gas flow backwards through the fan.

Dampers 346 may be operated in the closed position all the time or replaced with a solid wall forming in either case effectively a dead end pass. With such operation controller 361 would, of course, not operate the dampers but the control signal would immediately pass to controller 362 so that the gas recirculation fan is controlled in response to the temperature sensed by temperature transmitter 360.

When a fossil-fuel unit is being operated with the nuclear unit out of service, there is no steam passing through the nuclear steam superheater 307. Even though dampers 346 are closed, there is a possibility of leakage through those dampers or thermal gas currents which would be sufficient to overheat the tubing of the superheater 307. To avoid this inert gas such as helium is introduced at this time through inert gas inlet valve 370, passed through the nuclear superheater surface 307, and out through the inert gas outlet valve 371. The gas thus passed through the surface is cooled and recycled, or may be discharged to atmosphere if this can be economically justified. An inert gas rather than air is, of course, recommended to avoid internal corrosion of the steam surfaces.

The nuclear reactor steam generator 304 will generally be designed to operate at a pressure lower than the fossil-fuel steam generator 322. For typical steam cycles the feedwater temperature of the nuclear steam generator will be lower than that for the fossil-fuel unit and, accordingly, the nuclear economizer 319 is located in the flue 348 at a downstream location so as to be operative to efficiently cool the combustion products.

The nuclear steam cycle system includes a turbine bypass 381 and a turbine bypass valve 382 which discharge into a water separator 383. Water from the separator is discharged through water discharge line 384 to condenser 314 through line 385, or to condenser 332 through line 386. Steam separated in the water separator 383 passes outwardly through line 387 going to condenser 314 through line 388, or to condenser 332 through line 389. This bypass system is used during short electrical outages as is described in relation to FIG. 1.

The same bypass system including separator 383 and lines 384 through 389 is used in conjunction with the once-through steam generator 322 for startup thereof. Turbine bypass line 390 is used to bypass the turbines 326, 328 and 329 so that flow may be passed through the furnace wall tubes 340 during startup without steam passing through the turbine sections. Once-through steam generators of the type illustrated generally include a turbine bypass system to facilitate startup. These systems are generally designed to bypass in the order of 30 percent of the steam generator output during startup as is this system shown here. Sufficient cooling capacity must be placed in the condenser to condense the steam passing into the condenser without loss of condenser vacuum. Also with respect to the nuclear turbine bypass considerable condensing capacity is required. The arrangement illustrated here permits the use of either or both condensers at any one time. In the event of an electrical tripout, the fossil-fuel unit may be cut off entirely with the nuclear unit operating on bypass to both condensers. When electrical load is resumed, the nuclear cycle takes the initial load on the electrical generator 315 with the nuclear steam generator 304 going off the bypass system. At this time the bypass system is available for the startup of the fossil-fuel once-through steam generator 322.

In this embodiment the nuclear superheater 307 receives hot combustion gases directly from the furnace with little or no heating surface upstream. Accordingly, very hot gases pass over this nuclear superheater. With the high gas temperature relatively little heating surface is required in the nuclear superheater 307 because of the high temperature head available although relatively high alloy material may be required. Since this gas at high temperature has a high heat content, this arrangement is particularly effective where substantial heat is to be absorbed in the nuclear superheater. Recirculation of gases from the location just downstream of this superheater permits relatively hot gases to be recirculated to the furnace as compared to recirculation from the more remote locations in the flue 348 and, accordingly, tends to maintain a high level of heat content in the furnace gases, and avoids the disturbing effect of gas recirculation on other downstream surfaces. The installation of the nuclear economizer near the outlet of flue 348 operates to effectively and economically reduce the temperature of the flue gases passing to atmosphere. Since the nuclear cycle is generally working at a lower pressure than the fossil-fuel cycle, the temperature of the water entering the nuclear economizer 319 will generally lower the temperature of the water entering the fossil-fuel economizer 335.

Figure 4:
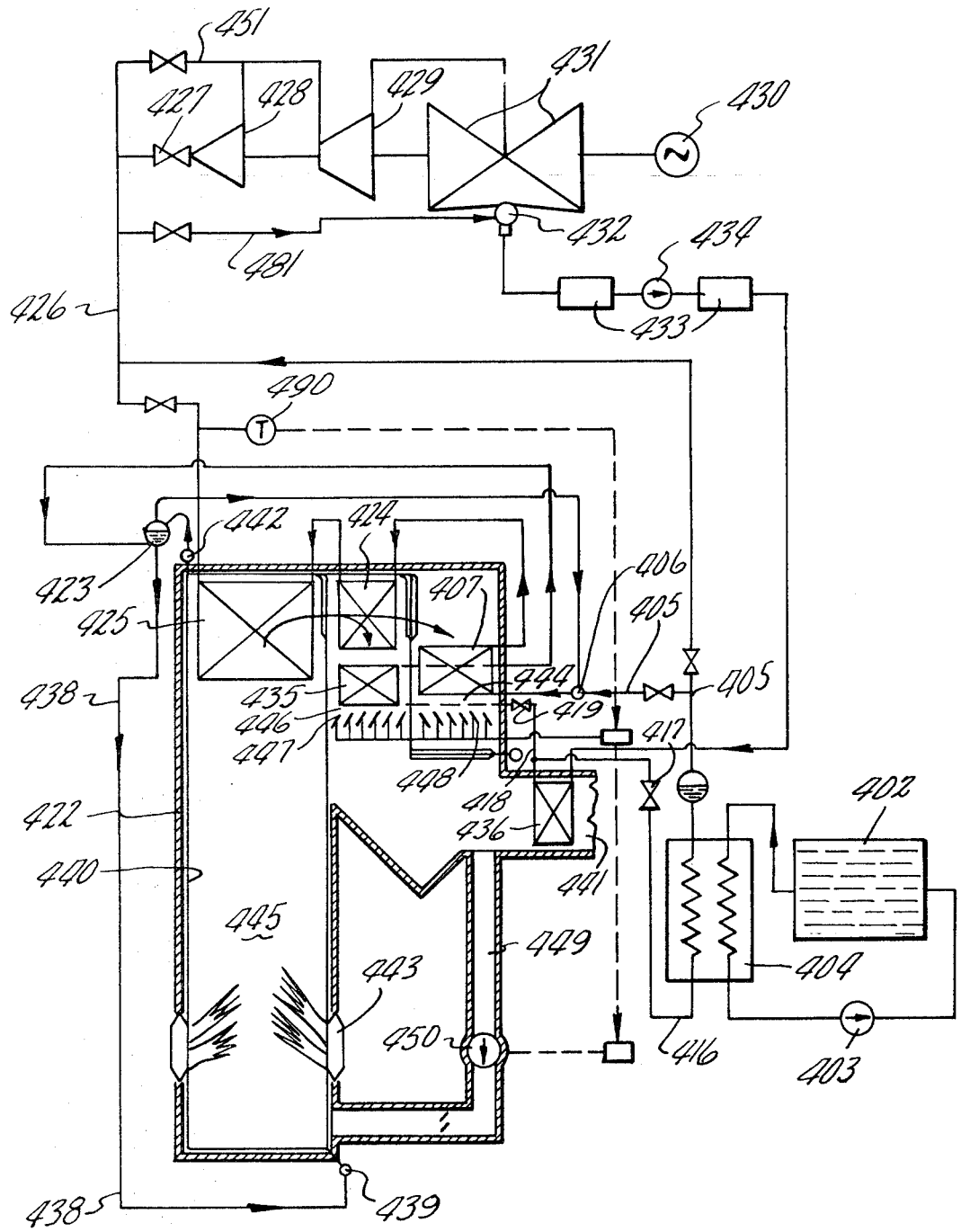
FIG. 4 is an application of my invention to a system in which the nuclear and fossil-fuel steam generators operate in parallel on a single turbine.

FIG. 4 illustrates an embodiment wherein the nuclear and fossil-fuel units are combined so that the steam produced from each passes through common turbine sections. Gas is circulated through the gas cooled reactor 402 by means of gas blower 403. The heat exchanger 404 is operative to generate essentially saturated steam which passes out through steam line 405. The steam is then conveyed to the mixing header 406.

Saturated steam passes from the steam drum 423 to the mixing header 406 where the steam from the nuclear steam generator 304 is mixed with it. The mixed steam flow is passed serially through the superheating sections 407, 424 and the high temperature mixed flow superheater 425. This steam is then conveyed through steam line 426 and turbine throttle valve 427 through the high-pressure 428, intermediate-pressure 429 and low-pressure 431 sections of the turbine which are connected to drive electric generator 430. The steam is condensed in condenser 432 with the condensate being passed by means of feedwater pump 434 through feedwater heaters 433 to the steam generators. This water being returned to the steam generators passes first through a mixed flow economizer 436.

A portion of the flow from the mixed flow economizer 436 passes through feedwater line 416 and feedwater control valve 417 to the nuclear steam generator. The remaining portion passes through feedwater line 418 and feedwater valve 419 to the fossil-fuel section economizer 435. From there it passes on to the steam drum 423.

Water circulates from the drum 423 from downcomer 438 to supply header 439 from which it passes up along the walls surrounding the furnace 445 through furnace wall tubes 440. The water-steam mixture is then collected in the outlet header 442 and conveyed to the drum 423 where the water and steam are separated.

Fuel and air are supplied to the furnace for combustion through tilting tangential burners 443. The combustion products pass upwardly through the furnace over the high temperature mixed flow superheater 425 and the intermediate temperature mixed flow superheater 424. The gas then passes through independent flues 444 and 446. Flue 446 contains the fossil-fuel economizer 435 and gas flow through this flue is controlled by gas pass dampers 447. The other independent flue 444 contains the low temperature mixed flow superheater 407 and gas flow through this flue is controlled by means of gas pass dampers 448. The gas then passes to exit through flue 441 which contains the mixed flow economizer 436 and an air heater (not shown).

Recirculating gas offtake duct 449 is located upstream of the mixed flow economizer 436 and operates by means of the gas recirculating fan 450 to recirculate cooled combustion gases into the furnace 445. As an increasing percentage of the total steam flow is generated in the nuclear steam generator 404, more superheating duty is imposed on the fossil-fuel steam generator. By opening dampers 448 while closing dampers 447, the increased gas flow over the low temperature superheater 407 effects such increased superheating. The gas recirculation fan 450 is operative to further increase the superheating, thereby extending the control range. The temperature of the steam leaving the superheater is sensed by temperature transmitter 490 and the dampers controlled in response thereto. When the dampers reach an extreme position, the control signal is transferred to gas recirculation fan 450.

The high-pressure turbine bypass line 451 and the turbine bypass line 481 operate in a manner as previously described in the other embodiments. Use of the mixed flow economizer surface 436 and mixed flow superheater surfaces has the advantage that it avoids the problems of overheating surfaces which may be installed during the period that the nuclear steam generator is inoperative. Since in the instant case the fossil-fuel is more expensive than the nuclear fuel, the use of an economizer for the feedwater being conveyed to the nuclear steam generator is of particular advantage only when it is helpful in reducing the gas temperature. It is, accordingly, poor economics to burn additional fossil-fuel in order to save nuclear fuel. Accordingly, while the feedwater for the fossil-fuel steam generator 422 is conveyed through both the mixed flow economizer 436 and a separate fossil-fuel economizer 435, less feedwater heating is accomplished of the feedwater being supplied to the reactor. The location of the gas recirculation offtake upstream of the mixed flow economizer 436 is advantageous since it permits the mixed flow economizer to substantially reduce the stack gas temperature when gas recirculation is in operation. If the gas recirculation were taken downstream of the mixed flow economizer, the increased gas flow thereover would substantially increase the gas temperature leaving the mixed flow economizer.

Figure 5:
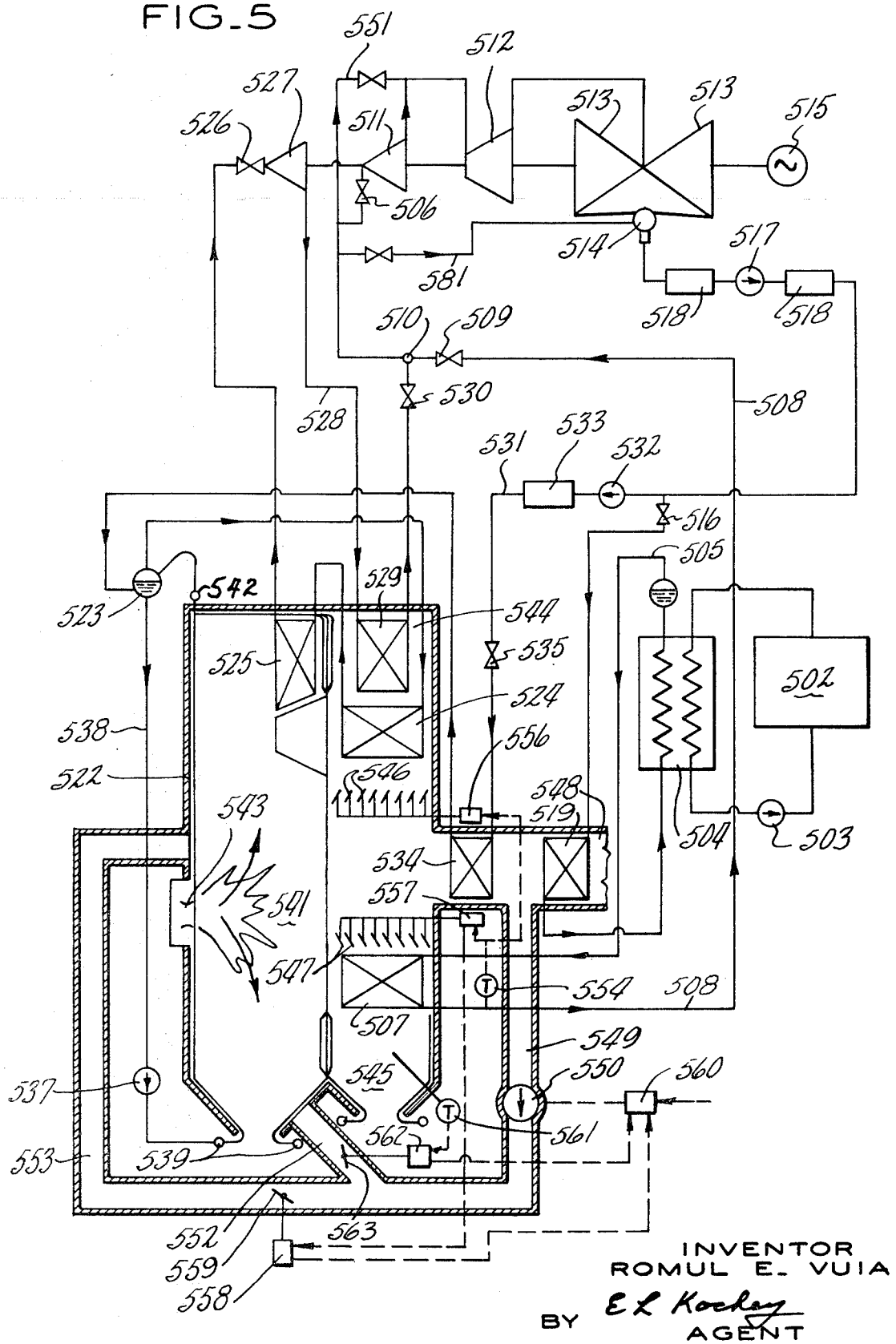
FIG. 5 is an embodiment of my invention in which the fossil-fuel unit operates on the high- and low-pressure sections of the turbine, while the lower-pressure section of the turbine operates also from the nuclear steam unit.

The embodiment of FIG. 5 includes a system wherein the fossil-fuel steam generator is combined with the nuclear steam generator and a steam turbine so that the fossil-fuel steam passes through the entire turbine, while the nuclear steam passes only through the lower-pressure portions. Primary fluid is circulated through the reactor 502 by means of circulating pump 503. The heat exchanger 504 is operative to generate essentially saturated steam which passes out through steam line 505.

The steam is conveyed through the nuclear stream superheater 507 and thence through steam line 508 through control valve 509 to a mixing vessel 510. Steam is conveyed from this mixing vessel through turbine throttle control valve 506 passing through the high-pressure section 511, the intermediate-pressure section 512 and the low-pressure section 513 of the turbine to condenser 514. These turbine sections are directly connected to electric generator 515. The condensate is then returned to the nuclear steam generator 504 by feedwater pump 517, passing through feedwater heaters 518 and nuclear economizer 519. Rate of flow to the nuclear steam generator 504 is controlled by regulating feedwater valve 516.

The nuclear superheater 507 and the nuclear economizer 519 are located in the gas flow path of the fossil-fuel fired steam generator 522. Steam passes from the steam drum 523 of this steam generator through the low temperature superheater 524 and the high temperature superheater 525. From here it passes then through throttle valve 526 which controls the flow through the superpressure section 527 of the turbine driving the the electric generator 515. The steam leaving the superpressure turbine 527 passes through steam line 528 to steam reheater 529 and thence through control valve 530 to mixing header 510. Here, this steam from the fossil-fuel fired steam generator is combined with the steam from the nuclear steam generator, and the combined steam continues through the intermediate 512 and low-pressure 513 turbine sections and the remainder of the previously described cycle.

After leaving the feedwater heaters 518 a portion of the feedwater is supplied to the fossil-fuel fired steam generator 522 through feedwater line 531. The separate high-pressure feedwater pump 532 operates to pass the feedwater through the high-pressure feedwater heaters 533 and the fossil-fuel unit economizer 534 to the steam drum 523. The flow to the steam drum is controlled by regulation of feedwater valve 535.

Water is recirculated within the steam generator by circulating pump 537, the water passing downwardly through the downcomers 538 into supply headers 539 and thence upwardly through the tubes 540 lining the walls of the furnace 541. The steam-water mixture thus formed is passed through the outlet header 542 and conveyed to the steam drum 523 where the steam and water is separated with the water passing through the downcomer 538 and the steam continuing on to the superheater 524.

Fossil-fuel such as oil is fired through burner 543 which is supplied with the fuel oil and combustion supporting air. The gases formed by the combustion of the oil in the furnace 540 pass through flues 544 and 545 with the quantity passing through each of these flues being regulated by manipulation of gas flow dampers 546 and 547, respectively. The gas leaving each of these flues is combined and conveyed to exit through flue 548 which contains the economizer 534, the nuclear steam generator economizer 519 and an air heater (not shown).

Gas recirculation duct 549 is located so as to withdraw flue gases from flue 548 at a location downstream of the economizer 534 but upstream of the nuclear economizer 519. Gas recirculation fan 550 located within the recirculating duct operates to recirculate these cooled flue gases back to the furnace. These gases may be introduced in the lower furnace near the gas exit to flue 545 by means of duct 552 or to a location in the furnace just above the burners 543 by means of duct 553.

Temperature transmitter 554 is located so as to sense the temperature of the steam leaving the nuclear steam superheater 507. A control signal is emitted from the temperature transmitter and conveyed to controller 556 which operates dampers 546, and to controller 557 which operates dampers 547. These controllers operate to open dampers 547 while closing dampers 546 whenever there is a temperature deficiency sensed by temperature transmitter 554. Controller 556 is blocked so as to set a minimum damper position on dampers 546.

When the dampers 547 reach a selected position near wide open, the control signal is emitted from controller 557 to controller 558 which operates gas control damper 559 recirculating cooled flue gases to the furnace through duct 553. Such recirculation is operative to increase the gas flow of hot furnace gases from the furnace 541 through flue 545 and consequently increasing the flow over the nuclear superheater 507. When the damper 559 approaches a preselected nearly wide open position, a control signal is emitted from controller 558 to controller 560 and is thereby operative to increase the speed of the gas recirculation fan 550.

Temperature transmitter 561 is located so as to sense the temperature of the gases in flue 545 entering the nuclear superheater 507. When these gases exceed a preselected maximum temperature, a control signal is emitted to controller 562 which is operative to open gas flow damper 563 which is located in gas duct 552. This introduces into the lower furnace adjacent the opening between the lower furnace and flue 545 cooled flue gases which have been withdrawn from flue 548. This introduction of cooled gases at this location operates to decrease the gas temperature in flue 545 and thereby protect the nuclear superheater surface 507 from excess gas temperature or slagging problems which are associated with high temperature. When the control damper 563 approaches a preselected nearly wide open position, a control signal is emitted from controller 562 to controller 560 to speed up gas recirculation fan 550.

While the control system which has been described illustrates the controls operating in one direction such that the gas recirculation fan speed is increased, they obviously also are adapted to decrease the fan speed as the dampers 559 and 563 tend to close. The speed of the gas recirculation fan must, however, always be satisfactory to meet the requirements of the damper most nearly wide open since the other damper can throttle the gas flow when the fan is tending to put out an excess.

The high pressure turbine bypass line 551 and the turbine bypass line 581 operate as described in the previous embodiments. The placing of all the nuclear superheat surface in one flue while all the fossil-fuel fired superheat surface is in the second flue extends the control range of the unit since it avoids interaction of the heat absorption of the two circuits. The use of a common flue with the fossil-fuel economizer lowers the stack temperature and increases the efficiency of the unit. The use of a nuclear economizer downstream of the fossil-fuel economizer is particularly effective in decreasing the stack temperature because of the lower temperature fluid which would be entering the nuclear economizer. This permits a higher gas temperature to leave the fossil-fuel economizer and consequently a higher temperature head existing throughout the fossil-fuel economizer with a resultant saving in surface. This higher gas temperature is similarly effective to reduce the surface requirements of the fossil-fuel superheater and the nuclear superheater.

Since the flues leave the furnace from locations remote from one another, it is less difficult to keep the nuclear superheater cool when operating on only the fossil-fuel cycle. With dampers 547 closed and no gas flow over the nuclear superheater 507, all the furnace gases pass upwardly through the furnace and out through flue 544. Accordingly, there is relatively little disturbance of the gases in the lower furnace and as a result little tendency for the hot furnace gases to overheat the nuclear superheater 507. In addition gas recirculation fan 550 may be operated passing cooled gases through duct 552 cooling the lower furnace adjacent flue 545.

The embodiment of FIG. 6 employs the nuclear steam cycle in combination with a twin furnace fossil-fuel fired steam generator. Steam evolved from the boiling water reactor 602 passes through the steam line 603 to the low temperature 604, intermediate 605 and high temperature 606 sections of the nuclear steam superheater. The steam thus heated to 1,000° F. passes through steam line 607 and through the turbine throttle valve 608 thereby passing through and driving the high-pressure section 609, the intermediate-pressure section 610 and the low-pressure section 611 of the turbine. The steam leaving the low-pressure section 611 is condensed in the condenser 613. The turbine is directly connected to drive electric generator 614.

The water so condensed is returned to the reactor 602 by means of feedwater heaters 617, feedwater valve 618 and nuclear economizer 619.

The fossil-fuel steam generator 622 is of the twin furnace type having a first or nuclear steam furnace 623 which is predominantly associated with the nuclear steam superheating surfaces 604, 605 and 606 and a second or fossil-fuel steam heating furnace 624 which is associated with only fossil-fuel steam heating surface. Steam passes from the steam drum 624 through primary steam superheating section 625 associated with the first furnace 623 and thence through a low temperature superheater 627 located in the flue associated with the second furnace. The steam then passes serially through intermediate temperature superheater 628, high temperature superheater 629 and finishing superheater 630. From here the steam at a temperature of 1,000° F. passes through steam line 632 and turbine throttle valve 633. The steam passes through the high-pressure section 634 and low-pressure section 635 of a turbine which drives electric generator 637.

Steam leaving the low-pressure turbine section is condensed in condenser 638 and returned to the boiler by feedpump 639 passing through feedwater heaters 640 and feedwater control valve 642. Before entering the drum 624 the water is passed through a low temperature economizer 643.

Water within the fossil-fuel generator is circulated downwardly through downcomer 644 the circulation being assisted by circulating pump 645, and supplies the inlet headers 647 and 648. The water then passes upwardly through tubes 649 lining the walls of the respective furnaces entering outlet headers 650 and being conveyed therefrom to steam drum 624. Within the steam drum the water and steam mixture formed in the furnace wall tubes 649 is separated with the water passing downwardly through downcomer 644 and the steam passing onto primary superheater section 625.

Pulverized coal is fired into each of the furnaces through tilting tangential burners 653. Ash is removed as molten slag through the slag taps 654 with the slag passing into the quench tanks 655. Flue gases pass upwardly through the respective furnaces with the gases from the fossil-fuel steam heating furnace 624 passing to discharge through flue 656 while the flue gases from furnace 623 pass out to discharge through flue 657. Since the fuel burned in each furnace is operative to generate steam in the fossil fired unit while only that fuel burned in furnace 623 is operative to superheat the steam from the nuclear steam unit, the output of the fossil-fuel fired steam generator is controlled by regulating the fuel input into furnace 624 while the temperature of the steam leaving the nuclear steam superheater 607 is controlled by regulating the firing rate in furnace 623.

High-pressure turbine bypass line 651 and turbine bypass line 681 operate as described in the discussion of FIG. 1.

While I have illustrated and described a preferred embodiment of my invention it is to be understood that such is merely illustrative and not restrictive and that variations and modifications may be made therein without departing from the spirit and scope of the invention. I therefore do not wish to be limited to the precise details set forth but desire to avail myself of such changes as fall within the purview of my invention. For instance, since in the usual nuclear steam generator saturated steam is generated, the description has been directed to such a steam producing apparatus. This invention, however, would be equally applicable to a nuclear steam generator where steam with some degree of superheat was produced if it is desired to further superheat the steam to a high temperature level so that the temperature of the steam produced in conjunction with the nuclear reactor is relatively low temperature steam. Where a nuclear reactor itself operates to produce high-pressure superheated steam at high temperature, the nuclear system may operate on the reheat cycle. The steam for this cycle may be reheated in surface located in the fossil-fuel unit.

I claim:

1. A power apparatus comprising: a fossil-fuel fired steam generating unit having a furnace including a burner zone and having water cooled tubes lining the walls of said furnace; burners for burning fossil-fuel within said burner zone and a flue for conveying combustion products away from said burner zone; a nuclear reactor steam generating means generating low temperature steam; a nuclear steam superheating surface located within said fossil-fuel fired steam generator and remote from said burner zone and entirely downstream of said burner zone with respect to the flow of said combustion products; means for conveying steam from said nuclear steam generating means to said nuclear steam superheating surface; a steam consuming prime mover; means for conveying steam from said nuclear steam superheating surface to said prime mover, said prime mover comprising a multisection turbine having a first section designed exclusively for superheated steam; means for bypassing said first turbine section and introducing said bypass steam into the remaining turbine sections; means for determining the condition of the steam leaving said first turbine section; and means for regulatingly bypassing said first turbine section in response to said determination, to avoid excessive moisture in said first turbine section.

2. A power apparatus comprising: a fossil-fuel fired steam generating unit having a furnace including a burner zone and having water cooled tubes lining the walls of said furnace; burners for burning fossil-fuel within said burner zone and a flue for conveying combustion products away from said burner zone; a nuclear reactor steam generating means generating low temperature steam; a nuclear steam superheating surface located within said fossil-fuel fired steam generator and remote from said burner zone and entirely downstream of said burner zone with respect to the flow of said combustion products; means for conveying steam from said nuclear steam generating means to said nuclear steam superheating surface; a steam consuming prime mover; means for conveying steam from said nuclear steam superheating surface to said prime mover, said fossil-fuel fired steam generating unit containing a dead end gas pass; means for recirculating combustion products from the dead end of said dead end gas pass to the furnace; and nuclear steam superheating surface located within said dead end gas pass.

3. An apparatus as in claim 2 having also means for sensing the temperature of the steam leaving said nuclear superheater surface; and means for varying the recirculation of combustion products in response to said temperature sensing means.

4. An apparatus as in claim 2 having also a nuclear economizer located in said dead end gas pass on the dead end side of said nuclear superheater but upstream of said combustion product recirculation means; and means for conveying fluid from said nuclear economizer to said nuclear reactor steam generating means.

5. A power apparatus comprising: a fossil-fuel fired steam generating unit having a furnace including a burner zone and having water cooled tubes lining the walls of said furnace; burners for burning fossil-fuel within said burner zone and a flue for conveying combustion products away from said burner zone; a nuclear reactor steam generating means generating low temperature steam; a nuclear steam superheating surface located within said fossil-fuel fired steam generator and remote from said burner zone and entirely downstream of said burner zone with respect to the flow of said combustion products; means for conveying steam from said nuclear steam generating means to said nuclear stream superheating surface; a steam consuming prime mover; means for conveying steam from said nuclear steam super-heating surface to said prime mover; a second flue for conveying combustion products away from said burner zone; said nuclear steam superheating surface located within one of said flues; and means to control the relative combustion product flow passing through each of said flues.

6. An apparatus as in claim 5 having also means for sensing the temperature of the steam leaving said nuclear steam superheating surface and means to control the relative combustion product flow passing through each of said flues in response to said temperature sensing means.

7. An apparatus as in claim 5 having also fossil-fuel steam superheating surface located within said steam generating unit at a location downstream of said burner zone but upstream of both of said flues and means for passing the steam generated in said fossil-fuel fired steam generating unit through said fossil-fuel fired superheating means.

8. An apparatus as in claim 5 including also fossil-fuel steam superheating surface in a second of said flues; and means for conveying steam generated in said fossil-fuel fired steam generating unit through said fossil-fuel steam superheating surface.

9. Apparatus as in claim 8 including also a fossil-fuel economizer located in the second flue at a location downstream relative to the combustion product flow from said fossil-fuel steam superheating surface; and means for conveying water from said economizer to the steam generating portion of said fossil-fuel fired steam generating unit.

10. An apparatus as in claim 5 having at least one of said flues arranged to receive hot combustion products from the furnace directly and without substantial heating surface upstream of said flue relative to the flow of combustion products; said nuclear steam superheating surface located within said one flue at an upstream location therein.

11. An apparatus as in claim 10 having also means for sensing the temperature of the steam leaving said nuclear steam superheating surface and means responsive to said temperature sensing means to regulate the relative combustion product flow passing through said plurality of flues.

12. An apparatus as in claim 8 including also a common flue downstream of said plurality of flues receiving the combustion product flow passing through said plurality of flues; a second fossil-fuel steam superheating surface in said common flue; means for conveying steam through said second fossil-fuel steam superheating surface at a location upstream with relation to steam flow through the fossil-fuel steam superheating surface in said second of said flues; a fossil-fuel economizer located in said common flue at a location downstream, with respect to combustion product flow, of said second fossil-fuel steam superheating surface; and means for conveying water from said fossil-fuel economizer to the steam generating section of said fossil-fuel fired steam generator.

13. An apparatus as in claim 12 having also nuclear economizer surface located in said common flue at a location downstream, with respect to combustion product flow, of said fossil-fuel economizer; and means for conveying water from said nuclear economizer to said nuclear reactor steam generating unit.

14. An apparatus as in claim 12 including also means for withdrawing combustion products from the flue containing the nuclear steam superheating surface at a location immediately downstream of said nuclear steam superheating surface and reintroducing said combustion products into the furnace.

15. An apparatus as in claim 14 including also means for sensing the temperature of the steam leaving said nuclear steam superheating surface; and means responsive to said temperature sensing means to regulate the reintroduction of combustion products into the furnace.

16. An apparatus as in claim 10 wherein the flue containing said nuclear steam superheating surface is a dead end pass; means to recirculate combustion products from the dead end of said dead end pass to the furnace; and means to cool said nuclear steam superheating surface in the dead end pass when steam is not passing therethrough.

17. An apparatus as in claim 5 having also means for conveying steam to said nuclear steam superheating surface from said fossil-fuel fired steam generating unit; economizer water heating surface located within a second of said flues; and means for conveying water so heated in said economizer from said economizer to the steam generating portion of said fossil-fuel fired steam generating unit.

18. An apparatus as in claim 17 having also temperature sensing means for determining the temperature of the steam leaving said steam superheating surface; and means responsive to said temperature sensing means to regulate the relative combustion product flow passing through said first and second flues.

19. An apparatus as in claim 17 having also means for withdrawing combustion products from the flue, in which the nuclear steam superheating surface is located, at a location downstream of said steam superheating surface with respect to the combustion product flow, and reintroducing said combustion products into the furnace; and means for regulating such withdrawal and reintroduction.

20. An apparatus as in claim 17 having also a common flue receiving combustion product flow from both of said flues; mixed flow water heating economizer surface located within said common flue; means for conveying water from said mixed flow economizer to said economizer water heating surface; and means for conveying heated water from said mixed flow economizer to said nuclear reactor steam generating means.

21. An apparatus as in claim 20 having also means for withdrawing cooled combustion products from said flues at a location downstream of said economizer water heating surface but upstream of said mixed flow economizer, and reintroducing said combustion products into said furnace; means for determining the temperature of the steam leaving said steam superheating surface; means for regulatingly controlling the reintroduction of combustion products into said furnace in response to said sensed stream temperature.

22. An apparatus as in claim 5 with said nuclear steam superheating surface having at least a major portion located within one of said flues; and fossil-fuel steam superheating surface located within the second of said flues.

23. An apparatus as in claim 22 having also means sensing the temperature of the steam leaving said nuclear steam superheating surface; and means responsive to said temperature sensing means to control the relative combustion product flow passing through each of said two flues.

24. An apparatus as in claim 22 having also a common flue receiving combustion products from said two flues; a fossil-fuel economizer located within said common flue; and means for conveying water from said fossil-fuel economizer to the steam generating portion of said fossil-fuel fired generating unit.

25. An apparatus as in claim 24 having also a nuclear economizer located in said common flue at a location downstream with respect to the combustion product flow of said fossil-fuel economizer; and means for conveying water from said nuclear economizer to said nuclear reactor steam generating means.

26. An apparatus as in claim 24 having also means for withdrawing combustion products from said common flue at a location downstream of said fossil-fuel economizer and introducing said combustion products into said furnace.

27. An apparatus as in claim 26 having also means for sensing the temperature of the steam leaving said nuclear steam superheater; and means responsive to said temperature sensing means to regulate the reintroduction of combustion products into the furnace.

28. An apparatus as in claim 25 having also means for withdrawing combustion products from said common flue at a location intermediate said nuclear and fossil-fuel economizers and reintroducing said combustion products into the furnace.

29. A method of starting a nuclear power plant by the steps of: operating a nuclear fuel reactor to generate essentially saturated steam and establishing a first steam flow; conveying the first steam flow in the essentially saturated condition to a turbine and bypassing the high-pressure section of the turbine; burning fossil-fuel in a combination zone and establishing a flow of combustion products; passing water in radiant heat exchange relation with the combustion zone and establishing a second steam flow; passing the first steam flow in heat exchange relation with the combustion products superheating the first steam flow; thereafter passing the first steam flow through the high-pressure section of the turbine and stopping the bypass around said high-pressure section of the turbine.

30. A method of operating a superheated steam turbine having a high-pressure section and low-pressure sections comprising: passing steam serially through said turbine sections; determining the condition of the steam leaving said high-pressure section; bypassing steam around said high-pressure section in amounts sufficient to avoid wet steam within said high-pressure section in response to said determined steam condition.